(12) United States Patent
John et al.

(10) Patent No.: US 8,725,348 B2
(45) Date of Patent: May 13, 2014

(54) METHOD FOR DETECTING FAULTS IN AN ELECTRONICALLY CONTROLLED DRIVE SYSTEM OF A MOTOR VEHICLE

(71) Applicant: Bayerische Motoren Werke Aktiengesellschaft, Munich (DE)

(72) Inventors: Christoph John, Garching b. Muenchen (DE); Joerg Moellmann, Munich (DE); Wolfgang Gaertner, Chaoyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/943,985

(22) Filed: Jul. 17, 2013

(65) Prior Publication Data

US 2013/0304311 A1    Nov. 14, 2013

Related U.S. Application Data

(63) Continuation of application No. PCT/EP2011/072950, filed on Dec. 15, 2011.

(30) Foreign Application Priority Data

Jan. 18, 2011 (DE) .......................... 10 2011 002 805

(51) Int. Cl.
*G06F 11/00* (2006.01)
(52) U.S. Cl.
USPC ........................................ 701/33.6; 701/29.9
(58) Field of Classification Search
USPC ............................................. 701/33.6, 29.9
See application file for complete search history.

(56) References Cited

U.S. PATENT DOCUMENTS

| 4,856,798 | A | 8/1989 | Buma et al. |
| 5,665,026 | A | 9/1997 | Linden |
| 5,992,379 | A | 11/1999 | Bruedigam et al. |
| 6,407,554 | B1 | 6/2002 | Godau et al. |
| 6,622,071 | B2 | 9/2003 | Reuter |
| 6,932,441 | B2 | 8/2005 | Hellmann et al. |
| 7,236,871 | B2 | 6/2007 | Sah et al. |

(Continued)

FOREIGN PATENT DOCUMENTS

| DE | 195 09 492 A1 | 9/1996 |
| DE | 196 12 857 A1 | 10/1997 |

(Continued)

OTHER PUBLICATIONS

German-language Search Report dated Jul. 5, 2011 with partial English translation (Ten (10) pages).

(Continued)

*Primary Examiner* — Mary Cheung
*Assistant Examiner* — Yuen Wong
(74) *Attorney, Agent, or Firm* — Crowell & Moring LLP

(57) ABSTRACT

A method is provided for detecting faults in an electronically controlled drive system of a motor vehicle by way of an electronic control unit. The electronic control unit detects at least the accelerator pedal position and the longitudinal acceleration of the motor vehicle as input signals. The control unit is configured to carry out a first fault detection program independently of its actual functional scope, by which program, a fault is detected if a defined acceleration gradient, which is dependent on a change in the accelerator pedal position, is exceeded for longer than for a predefined time period.

7 Claims, 4 Drawing Sheets

(56) References Cited

U.S. PATENT DOCUMENTS

| | | |
|---|---|---|
| 7,437,218 B2 | 10/2008 | Funcke et al. |
| 7,469,179 B2 | 12/2008 | Thissen et al. |
| 2007/0173985 A1* | 7/2007 | Thissen et al. .................... 701/1 |

FOREIGN PATENT DOCUMENTS

| | | |
|---|---|---|
| DE | 197 31 283 A1 | 1/1999 |
| DE | 197 31 972 A1 | 1/1999 |
| DE | 199 60 782 A1 | 6/2001 |
| DE | 100 45 611 A1 | 3/2002 |
| DE | 101 18 708 A1 | 10/2002 |
| DE | 101 63 655 A1 | 7/2003 |
| DE | 102 49 689 A1 | 5/2004 |
| DE | 10 2004 047 925 A1 | 4/2006 |
| DE | 10 2005 022 294 A1 | 6/2006 |
| DE | 10 2008 014 511 A1 | 9/2009 |
| DE | 10 2009 002 900 A1 | 11/2010 |

OTHER PUBLICATIONS

International Search Report dated Mar. 28, 2012 with English translation (Four (4) ages).

International Search Report dated Apr. 10, 2013 w/ partial English translation (six (6) pages).

German-language Written Opinion (PCT/ISA/237) dated Apr. 10, 2013 (seven (7) pages).

* cited by examiner

METHOD FOR DETECTING FAULTS IN AN ELECTRONICALLY CONTROLLED DRIVE SYSTEM OF A MOTOR VEHICLE

CROSS REFERENCE TO RELATED APPLICATIONS

This application is a continuation of PCT International Application No. PCT/EP2011/072950, filed Dec. 15, 2011, which claims priority under 35 U.S.C. §119 from German Patent Application No. DE 10 2011 002 805.6, filed Jan. 18, 2011, the entire disclosures of which are herein expressly incorporated by reference.

BACKGROUND AND SUMMARY OF THE INVENTION

The invention relates to a method for detecting faults in an electronically controlled drive system of a motor vehicle and, in particular, to a method for detecting faults in an electronically controlled drive system of a motor vehicle by way of an electronic control unit which detects at least the accelerator pedal position and the longitudinal acceleration of the motor vehicle as input signals of the electronic control unit.

As a result of standards required by law (for example, ISO or CARB Standard Regulations), for many years, motor vehicle manufacturers have had to meet the requirement that electronic control units or electronically controlled systems in motor vehicles, such as the digital engine control or the adaptive transmission control, have to be capable of self-diagnosing. For example, the so-called OBD (On-Board Diagnosis) systems were developed on this basis. One example of a further development of an OBD system can be found in the applicant's German Patent document DE 197 31 283 A1.

In this respect, the electronic control units in the interior of the vehicle require a large amount of software for the purpose of self-diagnosis in addition to the software necessary for the purpose of actual functional control. One example of a self-diagnosis in the interior of the control device is described in the applicant's German Patent Document DE 196 12 857 A1.

Until now, the focus of the fault diagnosis required by law had been on the intrinsic safety of each individual control unit or each electronically controlled vehicle system itself. This results in high application expenditures. Particularly in the case of an engine control or internal-combustion engine control (for spark ignition engines or Diesel engines), a large number of stored characteristic diagrams will accumulate when each programmed function has to be secured. One example, just for the expenditures of a functional programming where a desired driving power is predefined as a function of the accelerator pedal position, is described in the applicant's German Patent Application DE 102 49 689 A1. If the characteristic diagrams for the functional programming illustrated there were to be diagnosed in an intrinsically secure manner, approximately twice the programming expenditures or twice the storage space would be required. The reason is that a fault detection threshold would have to be stored for each characteristic curve of the characteristic diagrams (for the principle, see FIG. 8).

In this case, "$\alpha_{FP}$" is the position of the accelerator pedal, and "$M_A$" is the desired drive torque. The characteristic curve illustrated in FIG. 8 (as a solid line) is one of many desired characteristic curves for which (shown by a broken line) a characteristic fault detection curve would be programmed.

It is an object of the invention to simplify a method for detecting faults in a drive system of a motor vehicle.

This and other objects are achieved according to the invention by a method for detecting faults in an electronically controlled drive system of a motor vehicle by way of an electronic control unit which detects at least the accelerator pedal position and the longitudinal acceleration of the motor vehicle as input signals of the electronic control unit. Independently of its actual functional scope, a first fault detection program is carried out by the control unit, by which a fault is detected when a defined acceleration gradient, dependent on an accelerator pedal position change, is exceeded for longer than a predefined time period.

In the case of the method according to the invention for detecting faults in an electronically controlled drive system of a motor vehicle by way of an electronic control unit, the electronic control unit collects at least the accelerator pedal position and the longitudinal acceleration of the motor vehicle as input signals. Independently of its actual functional scope, a first fault detection program can be carried out by the control unit, by which a fault is detected when a defined acceleration gradient dependent on an accelerator pedal position change is exceeded for longer than a predefined time period. The control unit is correspondingly programmed for implementing the method according to the invention.

The defined acceleration gradient, that is dependent on a change of the accelerator pedal position, preferably is limited by the maximal slope of a characteristic curve of the actual functional scope, by which a desired vehicle acceleration is predefined as a function of the accelerator pedal position. This maximal slope is determined empirically, particularly in driving tests, in order to detect which acceleration gradients the driver can still be expected to handle or control. The defined acceleration gradient(s) that is/are dependent on an accelerator pedal position change is/are stored in a memory of the control unit and integrated in the program of the control unit for implementing the method according to the invention.

In a further development of the invention, when the accelerator pedal is not actuated, a second fault detection program can be implemented by the control unit independently of its actual functional scope, by which second fault detection program, a fault is detected when a defined acceleration threshold value—which preferably is dependent on the vehicle speed—is exceeded longer than for a predefined time period.

In a further embodiment of the invention, in the event that a wheel slip control system is not activated, a third fault detection program can be implemented by the control unit independently of its actual functional scope, by which third fault detection program, a fault will be detected when, while the accelerator pedal is not actuated or the accelerator pedal angle is decreasing, an acceleration gradient determined from the rotational wheel speeds is positive longer than for a predefined time period, and simultaneously, a vehicle acceleration gradient not determined from the rotational wheel speeds is also positive. For this purpose, the control unit receives either directly or by way of digital bus information the rotational wheel speed values or the acceleration determined from the rotational wheel speeds as an input signal or signals. The rotational wheel speeds are detected anyhow in a known manner, for example, for a slip control, by way of corresponding sensors. A vehicle acceleration gradient not determined from the rotational wheel speeds may be determined, for example, by means of its own longitudinal acceleration sensor or from the speedometer signal (for example, the rotational transmission output speed).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 7:
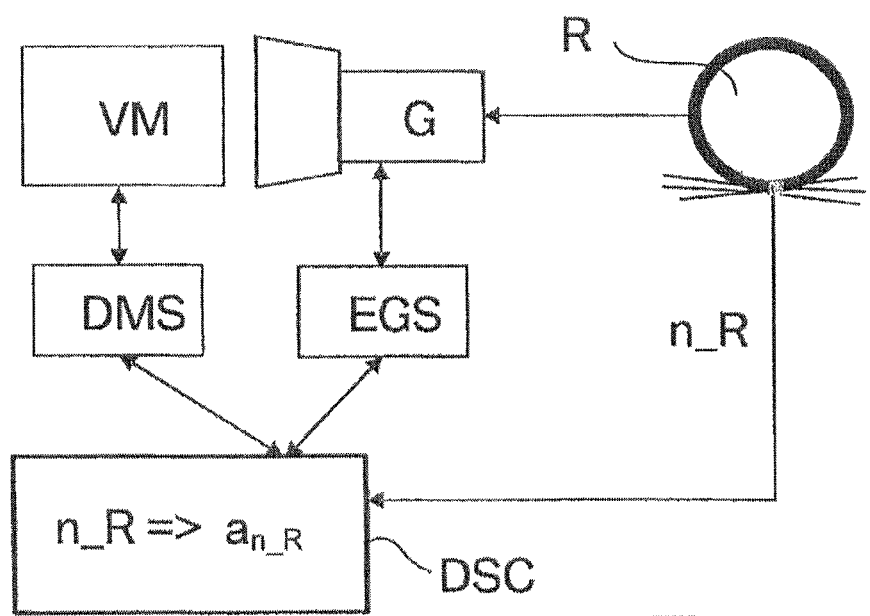
FIG. 7 is a schematic overview diagram of components of a motor vehicle with a possible network of electronically controlled systems.

FIG. 7 is a schematic overview diagram of components of a motor vehicle with a network of electronically controlled systems consisting of an internal-combustion engine VM having an electronic engine control unit DMS, an automatic transmission G having an electronic transmission control unit EGS and a brake system having an electronic brake control system DSC. The wheels R of the vehicle, which have sensors for detecting the rotational wheel speeds n_R, are also illustrated schematically.

The signals for detecting the rotational wheel speeds n_R are detected, for example, in the brake control unit DSC. An acceleration $a_{n\_R}$ is, for example, computed therefrom which was determined from the rotational wheel speeds. The engine control unit DMS receives the acceleration $a_{n\_R}$, that is determined from the rotational wheel speeds, for example, by way of a digital bus connection existing between all control units. In this context, FIG. 6 again is a schematic overview of a contemplated networking of the electronic control units DMS, DSC, EGS and optionally also of a driver assistance control unit FAS by way of digital bus connections.

Figure 6:
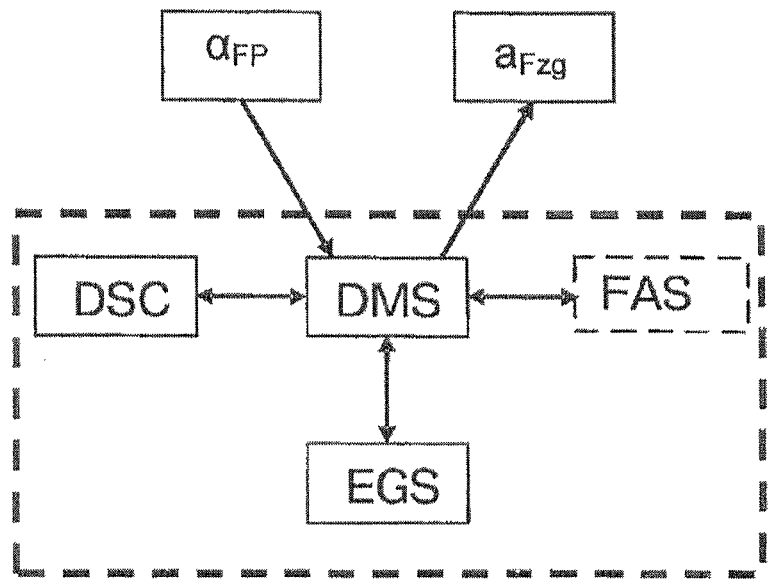
FIG. 6 is a schematic overview diagram of a possible networking of electronic control units to form electronically controlled systems in a motor vehicle.

According to FIG. 6, the electronic engine control unit DMS receives the position of the accelerator pedal, for example, directly by way of the signal of a sensor for measuring the accelerator pedal angle $\alpha_{FP}$ as well as the vehicle acceleration $a_{Fzg}$ directly by way of the signal of a sensor for measuring the longitudinal vehicle acceleration.

Figure 1:
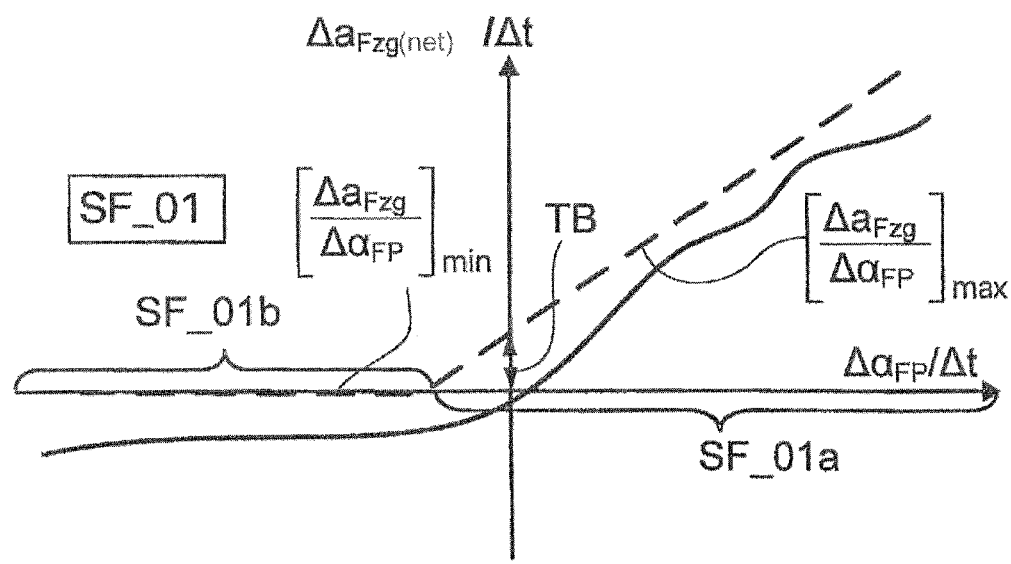
FIG. 1 is a graphical view of an example of the first fault detection program.

According to an embodiment of the invention, here, for example, by means of the electronic engine control unit DMS, which detects at least the accelerator pedal position $\alpha_{FP}$ and the longitudinal acceleration of the motor vehicle $a_{Fzg}$ as input signals, a first fault detection program SF_01 is carried out independently of its actual functional scope, unless another fault detection program precedes the first fault detection program. The "net" longitudinal acceleration of the motor vehicle $a_{Fzg(net)}$ mis a longitudinal acceleration that, in a known manner, if necessary, is corrected by a downhill-force acceleration. As illustrated in FIG. 1 by the broken line, a fault is therefore always detected when a defined acceleration gradient $\Delta a_{Fzg(net)}/\Delta t$, that is dependent on a accelerator pedal position change $\Delta\alpha_{FP}/\Delta t$, is exceeded longer than for a predefined time period. The actual course is outlined by the solid line and in this case would not result in a fault detection.

Figure 2:
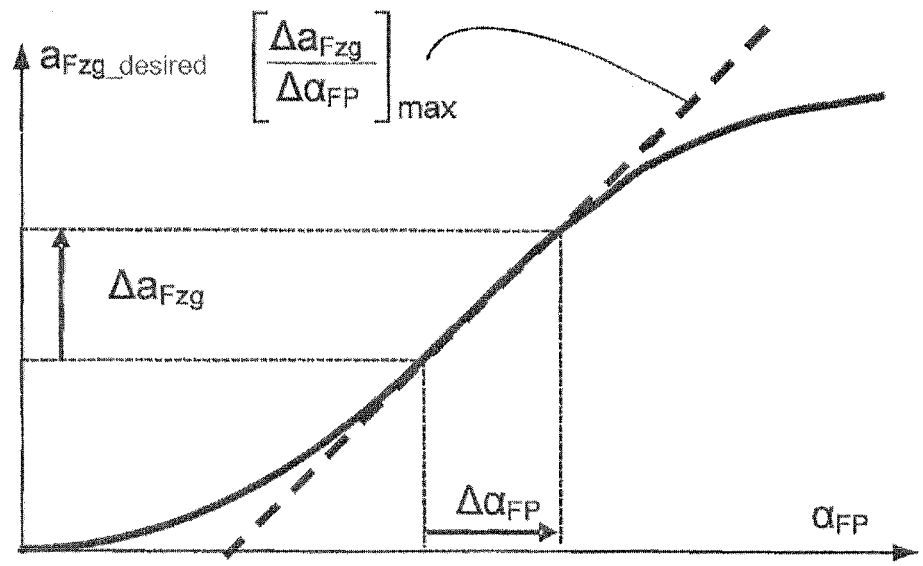
FIG. 2 is a graphical view of an example for determining a defined acceleration gradient that is dependent on an accelerator pedal position change.

According to FIG. 1, by use of the first fault detection program SF_01a, particularly for positive accelerator pedal position changes $\Delta\alpha_{FP}/\Delta t$, an acceleration gradient $\Delta a_{Fzg(net)}/\Delta t$, that is dependent on an accelerator pedal position change $\Delta\alpha_{FP}/\Delta t$, is defined according to a maximally permissible acceleration change $[\Delta a_{Fzg}/\Delta\alpha_{FP}]_{max}$ derived in FIG. 2.

The defined acceleration gradient $\Delta a_{Fzg(net)}/\Delta t$, that is dependent on an accelerator pedal position change $\Delta\alpha_{FP}/\Delta t$, is limited by the maximal slope $[\Delta a_{Fzg}/\Delta\alpha_{FP}]_{max}$ of a characteristic curve of the actual functional scope, by which a desired vehicle acceleration $a_{Fzg\_desired}$ is predefined as a function of the accelerator pedal position $\alpha_{FP}$. In this case, preferably, a tolerance range TB around $[\Delta a_{Fzg}/\Delta\alpha_{FP}]_{max}$ is additionally permitted (see FIG. 1).

According to FIG. 1, a minimal acceleration gradient $\Delta a_{Fzg(net)}/\Delta t$, here of, $[\Delta a_{Fzg}/\Delta\alpha_{FP}]_{max}$=zero, that is dependent on an accelerator pedal position change $\Delta\alpha_{FP}/\Delta t$, is defined by means of a first fault detection program SF_01b, particularly for negative accelerator pedal position changes $\Delta a_{FP}/\Delta t$. The reason is that a braking performance is thereby prompted by the driver, which should basically never cause an increase of acceleration.

Figure 3:
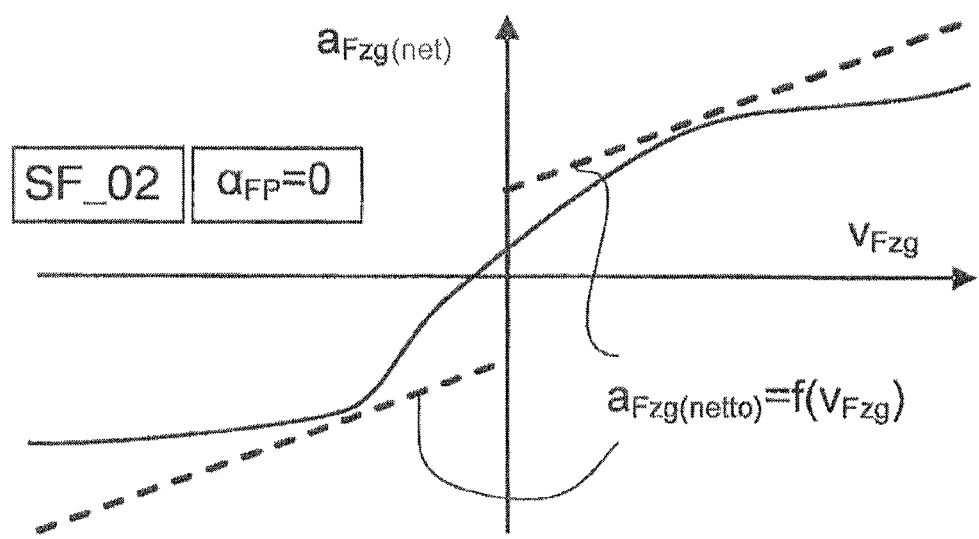
FIG. 3 is a graphical view of an example of the second fault detection program.
Figure 8:
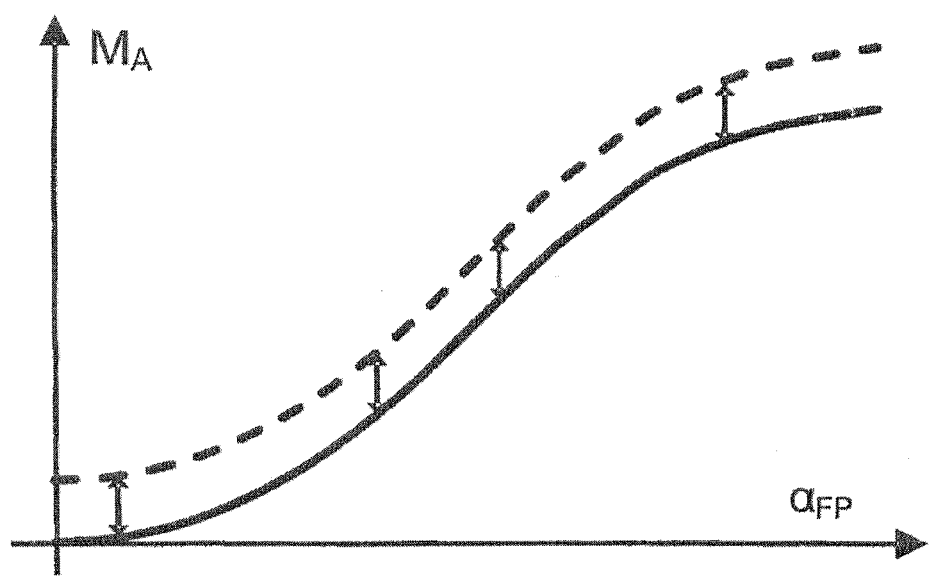
FIG. 8 is a view of a fault diagnosis according to the prior art.

FIG. 3 illustrates a second fault detection program SF_02, which takes the place of the first fault detection program SF_01, when the accelerator pedal $\alpha_{FP}$=0 is not actuated. Accordingly, when the accelerator pedal $\alpha_{FP}$=0 is not actuated, a fault is detected by way of the control unit DMS independently of its actual functional scope when a defined acceleration threshold value $a_{Fzg(net)}$, that preferably is dependent on the vehicle speed $V_{Fzg}$, is exceeded longer than for a predefined time period. The reason is that also no greater acceleration should occur in the coasting operation.

Figure 4:
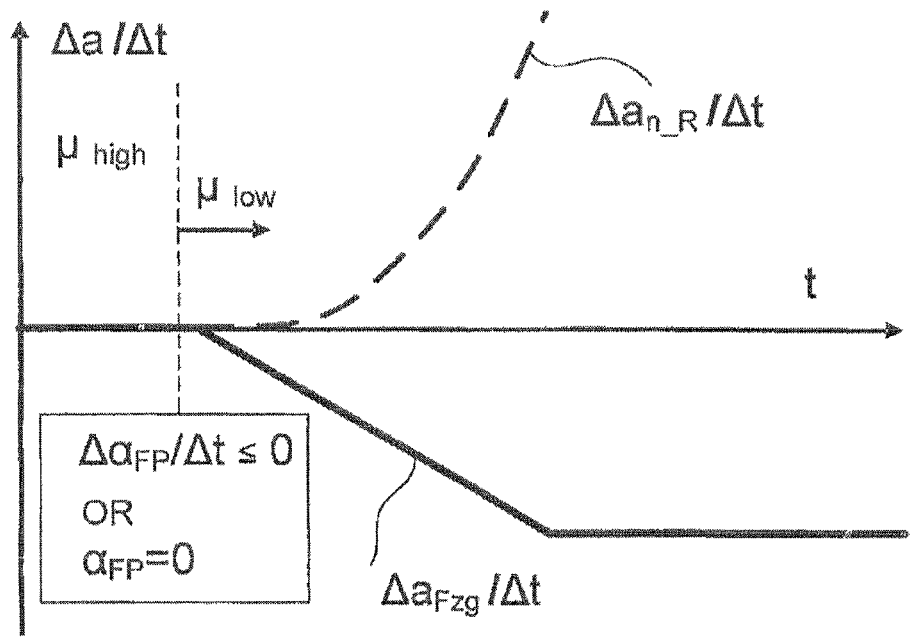
FIG. 4 is a graphical view of an example of the third fault detection program, where no fault is detected.
Figure 5:
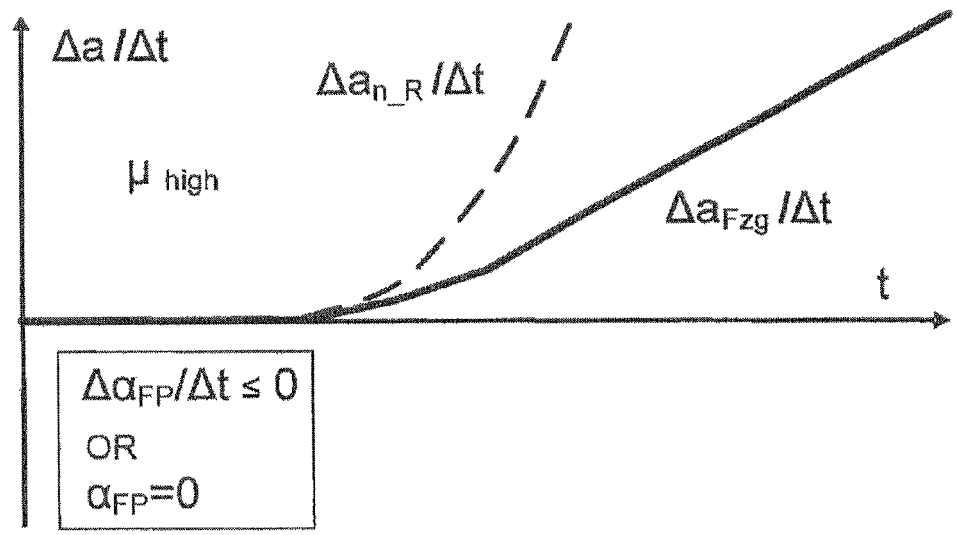
FIG. 5 is a graphical view of an example of the third fault detection program, where a fault is detected.

FIGS. 4 and 5 illustrate a further special case in the event that a wheel slip control system is not activated when wheel slip occurs that is not controlled by the brake control unit DSC. In this case, a third fault detection program SF_03 is implemented by way of the engine control unit DMS, also independently of its actual functional scope, in addition or instead of the first fault detection program SF_01, by which a fault is detected when, while the accelerator pedal is not actuated $\alpha_{FP}$=0, or while the accelerator pedal angle $\Delta\alpha_{FP}/\Delta t$,<0 is decreasing, an acceleration gradient $\Delta a_{n\_R}/\Delta t$ determined from the rotational wheel speeds is positive longer than for a predefined time period, and simultaneously, a vehicle acceleration gradient $\Delta a_{Fzg}/\Delta t$ not determined from the rotational wheel speeds n_R is also positive. By means of this fault detection, instead of the wheel slip control system or the brake control unit DCS, the engine control unit DMS can carry out a drive torque reduction and thereby provide a stable driving condition.

Therefore, no fault is detected in FIG. 4 because the trigger for the wheel slip is a change from a high coefficient of friction $\mu_{high}$ to a low coefficient of friction $\mu_{low}$ while the drive torque remains the same. This results in courses of the two acceleration gradients $\Delta a_{n\_R}/\Delta t$ and $\Delta a_{Fzg}/\Delta t$ in opposite directions. However, according to FIG. 5, a fault is detected within the functional scope because, despite the fact that the high coefficient of friction $\mu_{high}$ remains the same, the drive torque is prohibitively increased obviously by a fault in the drive system (for example, in the internal-combustion engine control unit DMS or in the transmission control unit EGS, FIG. 7). By comparing the course directions of the acceleration gradient $\Delta a_{n\_R}/\Delta t$ and of the vehicle acceleration gradient $\Delta a_{Fzg}/\Delta t$ (here positive courses in FIG. 5), it is excluded according to FIG. 5 that the permissible situation according to FIG. 4 is present (courses in opposite directions).

In principle, by means of all fault detection programs SF_01 (in the form of an acceleration change monitoring), SF_02 (in the form of an acceleration coasting monitoring), and SF_03 (in the form of a prevention of unintentionally spinning wheels), the drive torque is reduced or completely switched off in the event of a fault detection.

By use of this method according to the invention, a monitoring functionality is created that is comprehensive with respect to the system but is simple and is assigned to the engine control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting faults in an electronically controlled drive system of a motor vehicle, the method comprising the acts of:
   determining an accelerator pedal position of the motor vehicle;
   determining a longitudinal acceleration of the motor vehicle;
   supplying the accelerator pedal position and the longitudinal acceleration of the motor vehicle as input signals to an electronic control unit; and
   performing a first fault detection program by the electronic control unit, independent of an actual functional scope of the electronic control unit, by detecting a fault when a defined acceleration gradient, which is dependent on an accelerator pedal position change, is exceeded for longer than a predefined time period.

2. A method according to claim 1, wherein the defined acceleration gradient, dependent on the accelerator pedal position change, is limited by a maximal slope of a characteristic curve of the actual functional scope, by which a desired vehicle acceleration is predefined as a function of the accelerator pedal position.

3. A method according to claim 2, wherein when the accelerator pedal is not actuated, the electronic control unit performs a second fault detection program independent of an actual functional scope of the electronic control unit, wherein a fault is detected when a defined acceleration threshold value is exceeded for longer than a predefined time period.

4. A method according to claim 1, wherein when the accelerator pedal is not actuated, the electronic control unit performs a second fault detection program independent of an actual functional scope of the electronic control unit, wherein a fault is detected when a defined acceleration threshold value is exceeded for longer than a predefined time period.

5. A method according to claim 2, wherein in an event that a wheel slip control system of the motor vehicle is not activated, the electronic control unit performs a third fault detection program independent of an actual functional scope of the electronic control unit, wherein a fault is detected when, while the accelerator pedal is not actuated or while the accelerator pedal angle is decreasing, an acceleration gradient determined from rotational wheel speeds is positive for longer than a predefined time period and, simultaneously, a vehicle acceleration gradient not determined from the rotational wheel speeds is also positive.

6. A method according to claim 1, wherein in an event that a wheel slip control system of the motor vehicle is not activated, the electronic control unit performs a third fault detection program independent of an actual functional scope of the electronic control unit, wherein a fault is detected when, while the accelerator pedal is not actuated or while the accelerator pedal angle is decreasing, an acceleration gradient determined from rotational wheel speeds is positive for longer than a predefined time period and, simultaneously, a vehicle acceleration gradient not determined from the rotational wheel speeds is also positive.

7. A method according to claim 4, wherein in an event that a wheel slip control system of the motor vehicle is not activated, the electronic control unit performs a third fault detection program independent of an actual functional scope of the electronic control unit, wherein a fault is detected when, while the accelerator pedal is not actuated or while the accelerator pedal angle is decreasing, an acceleration gradient determined from rotational wheel speeds is positive for longer than a predefined time period and, simultaneously, a vehicle acceleration gradient not determined from the rotational wheel speeds is also positive.

* * * * *